US010059263B2

(12) United States Patent
Paszkowicz et al.

(10) Patent No.: US 10,059,263 B2
(45) Date of Patent: Aug. 28, 2018

(54) DYNAMIC LIGHTING APPARATUS AND METHOD (71) Applicant: Jaguar Land Rover Limited, Coventry (GB)

(72) Inventors: Sebastian Paszkowicz, Coventry (GB); George Alexander, Coventry (GB); Robert Hardy, Coventry (GB); Eduardo Dias, Coventry (GB); Anna Gaszczak, Coventry (GB); Thomas Popham, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 0 days.

(21) Appl. No.: 15/304,995

(22) PCT Filed: Apr. 15, 2015

(86) PCT No.: PCT/EP2015/058152
§ 371 (c)(1),
(2) Date: Oct. 18, 2016

(87) PCT Pub. No.: WO2015/165730
PCT Pub. Date: Nov. 5, 2015

(65) Prior Publication Data
US 2017/0043712 A1 Feb. 16, 2017

(30) Foreign Application Priority Data
May 1, 2014 (GB) .................................. 1407714.3

(51) Int. Cl.
*B60Q 3/00* (2017.01)
*B60R 1/00* (2006.01)
(Continued)

(52) U.S. Cl.
CPC ................. *B60R 1/00* (2013.01); *B60K 35/00* (2013.01); *B60K 37/06* (2013.01); *B60Q 1/24* (2013.01);
(Continued)

(58) Field of Classification Search
CPC ..................................... B60Q 3/02; G06T 7/70
(Continued)

(56) References Cited

U.S. PATENT DOCUMENTS 4,625,329 A    11/1986  Ishikawa et al.
8,885,882 B1*  11/2014  Yin ........................... G06F 3/00
                                                                        382/103
(Continued)

FOREIGN PATENT DOCUMENTS

DE          29822554 U1      3/1999
DE   10 2007 049 710 A1     4/2009
(Continued)

OTHER PUBLICATIONS

Combined Search and Examination Report, GB Application No. 1407714.3, dated Nov. 4, 2014, 5 pages.
(Continued)

*Primary Examiner* — Tan Q Nguyen
(74) *Attorney, Agent, or Firm* — Myers Bigel, P.A.

(57) ABSTRACT

The present disclosure relates to a method for selectively highlighting visual zones associated with a vehicle. A point of origin and a gaze direction of a vehicle occupant are determined and a virtual projection plotted corresponding to the gaze of the vehicle occupant. The virtual projection extends from the determined point of origin in a direction of the determined gaze direction. With reference to a three-dimensional model comprising a plurality of pre-defined areas of interest, an intersection of the virtual projection with one of the plurality of areas of interest is identified. The
(Continued)

method comprises controlling an illumination source that is associated with the determined one of said plurality of areas of interest so as to highlight a visual zone associated with the vehicle.

20 Claims, 9 Drawing Sheets

(51) Int. Cl.
| | | |
|---|---|---|
| B60Q 1/24 | (2006.01) | |
| B60Q 3/76 | (2017.01) | |
| B60Q 3/80 | (2017.01) | |
| B60Q 3/16 | (2017.01) | |
| B60K 35/00 | (2006.01) | |
| B60K 37/06 | (2006.01) | |
| G06T 7/70 | (2017.01) | |

(52) U.S. Cl.
CPC ............... *B60Q 3/16* (2017.02); *B60Q 3/76* (2017.02); *B60Q 3/80* (2017.02); B60K 2350/2069 (2013.01); B60Q 2300/23 (2013.01); B60Q 2500/00 (2013.01); B60R 2300/105 (2013.01); B60R 2300/8006 (2013.01)

(58) Field of Classification Search
USPC .......................................................... 701/36
See application file for complete search history.

(56) References Cited

U.S. PATENT DOCUMENTS 9,703,374 B1* 7/2017 Zhang ..................... G06F 3/013

2007/0078552 A1* 4/2007 Rosenberg ............ G06F 1/1626
700/94
2008/0212835 A1* 9/2008 Tavor ...................... G06K 9/32
382/103
2010/0014711 A1* 1/2010 Camhi ................... B60K 28/06
382/104
2010/0034427 A1* 2/2010 Fujimura ............ G06K 9/00201
382/106
2011/0228051 A1* 9/2011 Dedeoglu .......... H04N 13/0022
348/46
2015/0070262 A1* 3/2015 Peters .................... G06F 3/013
345/156
2015/0379362 A1* 12/2015 Calmes ............... G06K 9/2036
348/136

FOREIGN PATENT DOCUMENTS

| DE | 10 2012 016 258 A1 | 2/2014 |
|---|---|---|
| EP | 2 390 139 A1 | 11/2011 |
| JP | 9-76815 A | 3/1997 |
| JP | 2008-081053 A | 4/2008 |
| JP | 2010-000893 A | 1/2010 |
| JP | 2010-269736 A | 12/2010 |

OTHER PUBLICATIONS

Notification of Transmittal of the International Search Report and the Written Opinion of the International Searching Authority, or the Declaration, PCT/EP2015/058152, dated Jul. 21, 2015, 13 pages.
Office Action with English language translation, JP Application No. 2016-565498, dated Oct. 31, 2017, 5 pp.

* cited by examiner

DYNAMIC LIGHTING APPARATUS AND METHOD

RELATED APPLICATIONS

This application is a 35 U.S.C. § 371 national stage application of PCT Application No. PCT/EP2015/058152, filed on Apr. 15, 2015, which claims priority from Great Britain Patent Application No. 1407714.3 filed on May 1, 2014, the contents of which are incorporated herein by reference in their entireties. The above-referenced PCT International Application was published in the English language as International Publication No. WO 2015/165730 A1 on Nov. 5, 2015.

TECHNICAL FIELD

The present disclosure relates to a dynamic lighting apparatus and method and particularly, but not exclusively, to an apparatus for selectively highlighting visual zones associated with a vehicle, to a vehicle comprising a dynamic lighting apparatus and a method for the same.

BACKGROUND

Interior and exterior lighting plays an important role in modern day vehicles and can provide vehicles with, for example, a signalling capability, a guiding capability, informative displays, and so forth.

For example, exterior vehicle lights such as headlamps can provide illumination in front of the vehicle. The headlamps can assist a driver of the vehicle to see where they are going in a poorly lit environment and also can alert persons outside of the vehicle as to the presence of the vehicle. In this regard, various types of headlamps may be provided, such as the so-called "dipped beam" and "main beam" headlamps. Auxiliary lamps can also be provided about the vehicle to assist driver direction. For example, off-road lamps, fog lamps, cornering lamps and spot lights can be provided so as to provide the vehicle with enhanced capabilities to allow the driver to see where there are going or to generally increase the driver's field of view in poorly lit environments. Further, conspicuity, signal and identification lights such as directional indicators (flashing lights disposed at the sides of the vehicle) can be used to indicate an intended manoeuvre to be performed by the vehicle (such as a turn).

The vehicle can also be provided with various lights inside a cabin of the vehicle, for example, to enable the driver and/or passenger to easily locate various components inside the vehicle, such as controls located on a steering wheel, an instrument panel, a roof console and bins located in doors of the vehicle. Illumination can also be provided in the form of information panels, displays or touch screens within the vehicle cabin.

At least in certain aspects, the present invention seeks to ameliorate or overcome certain shortcomings associated with prior art interior and/or exterior illumination systems.

SUMMARY OF THE INVENTION

Aspects of the present invention relate to a method for selectively highlighting visual zones associated with a vehicle; a dynamic lighting apparatus for selectively highlighting visual zones associated with a vehicle; and a vehicle comprising a dynamic lighting apparatus, as set out in the appended claims.

According to another aspect of the present invention, there is provided a method for selectively highlighting visual zones associated with a vehicle, the method comprising: determining a point of origin in three-dimensional coordinate space based on the position of a vehicle occupant's head; determining a gaze direction of the vehicle occupant; using the determined point of origin and the determined gaze direction to plot a virtual projection, the virtual projection extending from the determined point of origin in a direction of the determined gaze direction; and with reference to a three-dimensional model comprising a plurality of predefined areas of interest, determining that the virtual projection has intersected one of the plurality of areas of interest and controlling an illumination source that is associated with the determined one of said plurality of areas of interest so as to highlight a visual zone associated with the vehicle. The use of the three-dimensional model along with the determination of both the point of origin and gaze direction means that the area of interest can be readily determined, taking into account both head position and eye movement. Furthermore, at least in certain embodiments, the three-dimensional model can provide improved accuracy over prior art systems. It will be appreciated that the virtual projection can be integrated with the three-dimensional model. The virtual projection can at least substantially match a line of sight of the vehicle occupant.

At least in certain embodiments, the use of the three-dimensional model can provide improved system control. A depth component can be modelled when the virtual projection is integrated with the three-dimensional model. At least in certain embodiments, this can provide improved modelling of a line of sight of the vehicle occupant to identify the visual zone of interest. For example, the three-dimensional model can be used to determine if the vehicle occupant is looking around or past a feature in the cabin or externally. A front-seat passenger could, for example, look into the rear of the cabin behind the driver seat; or a driver could look around an A-pillar to provide improved external lighting control.

Selective highlighting can be provided based on a determination concerning where the vehicle occupant is currently looking. The selective highlighting can enhance functionality of the vehicle and improve the vehicle occupant's visual acuity. For example, where the occupant is looking at a visual zone within the vehicle (e.g. a storage compartment), the highlighting function can facilitate identification of a feature of the vehicle or an item within the vehicle. The vehicle occupant can also be provided with an improved scotopic vision in a poorly illuminated or low-lit environment due to the absence of highlighting where it is not needed. Where the occupant is looking at a visual zone outside of the vehicle, the vehicle occupant can be provided with a better visual capability so that, for example, they can avoid possible obstructions or hazards that are in proximity to the vehicle.

The three-dimensional model can comprise a virtual representation of a portion of the interior of a cabin of the vehicle. Alternatively, or in addition, the three-dimensional model can comprise a virtual representation of a region surrounding some or all of the vehicle for highlighting visual zones disposed externally of the vehicle. The plurality of areas of interest can be predefined areas or regions within the three-dimensional model. The areas of interest can each correspond to one of said visual zones within the vehicle cabin. Accordingly, the model can represent part or all of the vehicle cabin so that the plot of the virtual projection can accurately determine an area of interest, which corresponds to a visual zone of the vehicle cabin which is currently being looked at by the vehicle occupant (such that appropriate highlighting can be provided).

The point of origin can be determined using a face recognition algorithm. Hence, the vehicle occupant's face can be detected and processed to determine a point of origin for the virtual projection. This allows for a determination of area of interest to be made without requiring the head position to be fixed in the cabin.

The gaze direction can use an eye tracking algorithm. This can act to approximate a direction in which the vehicle occupant is looking and can also approximate a virtual focal point so as to assist in the determination of the area of interest.

One or more sensors can be provided to determine the point of origin and gaze direction. The one or more sensors can be an image sensor, such as a camera. The point of origin and the gaze direction can be determined using image data received from two or more image sensors located within the vehicle. Using two or more image sensors means that a three-dimensional point of origin can be determined (i.e. as a depth dimension can be calculated in addition to other spatial dimensions). A stereo camera can be used to determine both the point of origin and the gaze direction.

The visual zone can be highlighted by illuminating said illumination sources associated with that visual zone. Each of the plurality of areas of interest can be associated with a dedicated illumination source. The selective highlighting of a visual zone can therefore be performed by controlling an appropriate illumination source for the determined area of interest. The illumination source can be disposed proximal to the associated visual zone; or the illumination source can be disposed remote from the associated visual zone and configured to project light onto the visual zone. The controlling of the illumination source can be performed by increasing an output intensity of the illumination source. In this manner, the illumination can appear as a highlighting of a particular visual zone associated with the vehicle.

A diffuser can be provided in front of said illumination source. A light tube can be coupled to the illumination source to disperse light over an elongated area. The illumination source can, for example, comprise a Light Emitting Diode (LED) or an incandescent lamp.

The areas of interest for which no intersection has been determined can be increased; and an output intensity of illumination sources associated with the identified areas of interest can be decreased. This has the effect of providing a decreased intensity for visual zones which are not currently being looked at by the vehicle occupant. This in turn can improve the vehicle occupant's scotopic vision, particularly in low external light conditions (e.g. when driving at night). A reduction in the output intensity of the illumination source could be proportional to a distance from the virtual projection to the associated area of interest. Thus, the output intensity of the illumination source can be less for those visual zones positioned further away from the direction in which the vehicle occupant is looking.

A plurality of areas of interest can be defined. The areas of interest can be subdivided into first and second subsets each consisting of one or more of said areas of interest. The area(s) of interest in said first subset can each be associated with the vehicle interior. The area(s) of interest in said second subset can each be associated with the vehicle exterior.

The associated illumination source can be arranged to provide highlighting of a visual zone that is substantially inside of the vehicle for an intersection of the virtual projection with one of the first subset of the plurality of areas of interest. This can act to highlight visual zones within the vehicle, such as storage compartments, displays, control panels, and so forth. In doing so, the highlighted area of interest allows the vehicle occupant to quickly locate particular features or components of the vehicle. The selective highlighting within the vehicle means that when the vehicle occupant is not focussed on any visual zone corresponding to an area of interest of the first subset, the risk of being distracted by illumination of such a visual zone is reduced (as this visual zone would not be highlighted).

The associated illumination source can be arranged to provide highlighting of a visual zone that is substantially outside of the vehicle for an intersection of the virtual projection with one of a second subset of the plurality of areas of interest. For example, auxiliary lamps can be provided about the vehicle such that visual zones outside of the vehicle can be highlighted when the vehicle occupant is determined to be looking towards those visual zones. To provide additional refinement, the three-dimensional model could be analysed to determine the location at which the virtual projection intersects the predefined area of interest.

According to another aspect of the present invention, there is provided a dynamic lighting apparatus for selectively highlighting visual zones associated with a vehicle, the dynamic lighting apparatus comprising: at least one processor; and at least one memory including computer program code, the at least one memory configured to store a three-dimensional model comprising a plurality of areas of interest, wherein the at least one memory and the computer program code configured to, with the at least one processor, cause the dynamic lighting apparatus to at least: determine a point of origin in three-dimensional coordinate space based on a vehicle occupant's head position; determine a gaze direction of the vehicle occupant; use the determined point of origin and the determined gaze direction to plot a virtual projection, the virtual projection extending from the determined point of origin in a direction of the determined gaze direction; and with reference to the three-dimensional model, based on a determination that the virtual projection has intersected one of the plurality of areas of interest, control an illumination source that is associated with the determined one of the plurality of areas of interest so as to highlight a visual zone associated with the vehicle.

The three-dimensional model can comprise a representation of an interior portion of a cabin of the vehicle. The plurality of areas of interest can be predefined areas of the three-dimensional model, each of the plurality of areas of interest corresponding to a visual zone associated with the interior portion of the vehicle cabin.

The processor can be configured to cause the dynamic lighting apparatus to determine the point of origin using a face recognition algorithm. The processor can be configured to cause the dynamic lighting apparatus to determine the gaze direction using an eye tracking algorithm. Two or more image sensors can be configured to provide image data for determining the point of origin and the gaze direction.

The processor can be configured to cause the dynamic lighting apparatus to control the illumination source by increasing an output intensity of the illumination source.

The processor can be configured to cause the dynamic lighting apparatus to identify the areas of interest for which no intersection has been determined and to reduce an output intensity of one or more illumination sources associated with the identified areas of interest.

The associated illumination source can be arranged to provide highlighting of a visual zone that is substantially inside of the vehicle for an intersection of the virtual projection with one of a first subset of the plurality of areas of interest. Alternatively, the associated illumination source can be arranged to provide highlighting of a visual zone that is substantially outside of the vehicle for an intersection of the virtual projection with one of a second subset of the plurality of areas of interest.

According to a further aspect of the present invention there is provided a vehicle comprising a dynamic lighting apparatus as described herein. The three-dimensional model can comprise a virtual representation of at least a portion of the interior of the cabin of said vehicle. The vehicle can comprise at least one illumination source associated each area of interest. The processor can be configured to output a control signal to control operation of the or each illumination source. The control signal can, for example, be output to a communication network, such as a CAN bus. The vehicle can comprise one or more image sensors configured to output image data to the processor.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present invention will now be described, by way of example only, with reference to the accompanying figures, in which.

DETAILED DESCRIPTION OF AN EMBODIMENT

A dynamic lighting apparatus 1 for a vehicle V in accordance with an embodiment of the present invention will be described with reference to the accompanying Figures. The dynamic lighting apparatus 1 is configured to control on-board lighting in dependence on where a driver D is looking in a cabin C of the vehicle V.

Figure 1:
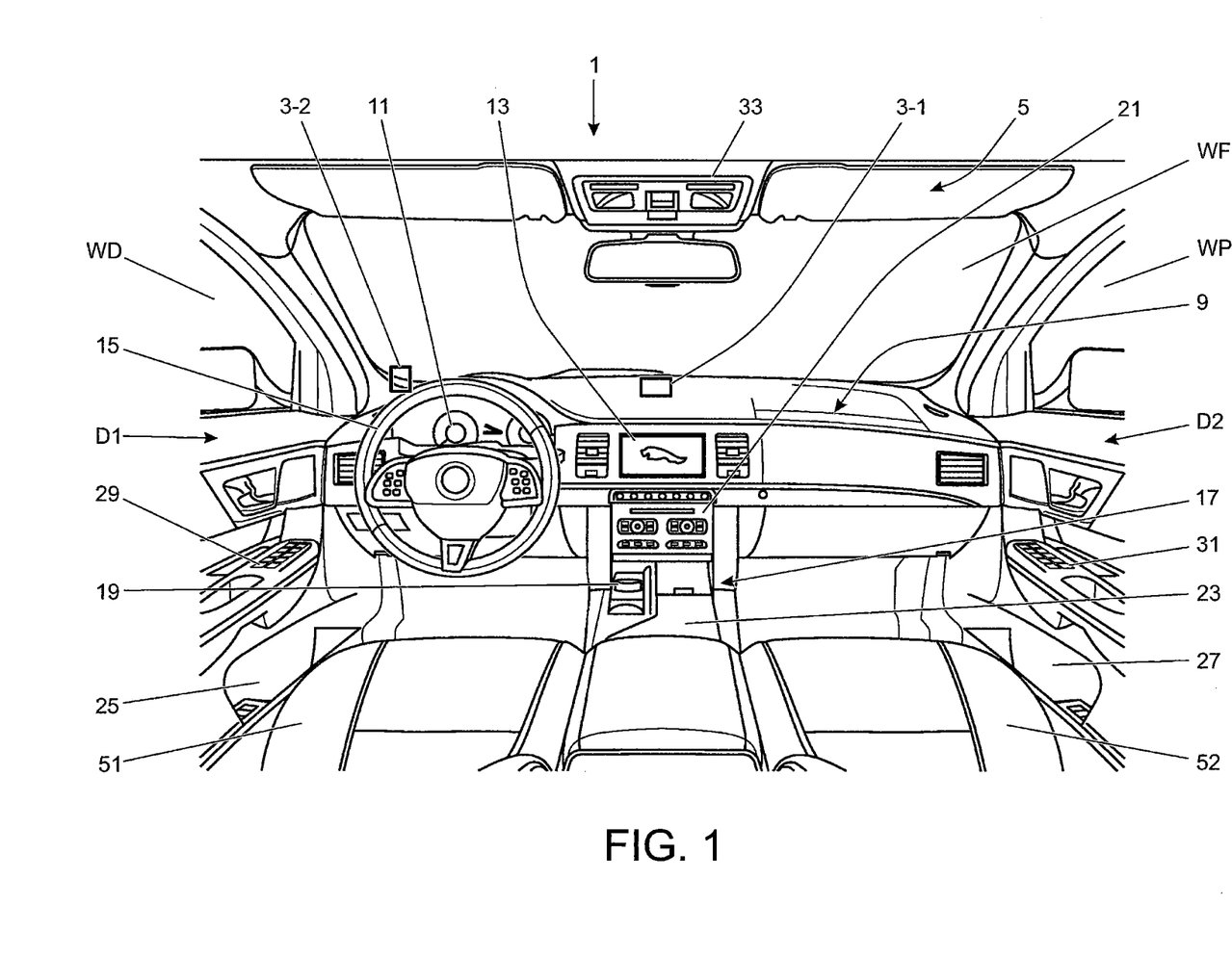
FIG. 1 is a perspective view of a front portion of a vehicle cabin incorporating a dynamic lighting apparatus according to an embodiment of the present invention.

A perspective interior view of a front portion of a vehicle cabin C having first and second image sensors 3-1, 3-2 is shown in FIG. 1. The cabin C accommodates the vehicle occupants, typically the driver D and one or more passengers, and includes various user interfaces for operating vehicle systems. The front portion of the cabin C is defined by the interior of the vehicle V that is housed between a roof portion 5, a front windscreen $W_F$, a rear windscreen $W_R$, driver and passenger side doors D1, D2, and a vehicle floor (not shown). The cabin C comprises a driver seat S1 for seating the driver and a passenger seat S2 for seating the passenger. The driver seat S1 is accordingly located on a driver side and the passenger seat S2 is located opposite on a passenger side. A driver side window $W_D$ is provided in the driver side door D1; and a passenger side window $W_P$ is provided in the passenger side door D2. It will be appreciated that the invention can be applied in left- and right-hand drive vehicles by changing the location of the first and second image sensors 3-1, 3-2.

A dashboard 9 is located below the front windscreen $W_F$ and extends between the driver and passenger side doors D1, D2. The dashboard 9 comprises an instrument display panel 11 (in the form of an instrument cluster comprising a tachometer, speedometer, and fuel gauge) and an infotainment system display panel 13 (which may also function as a satellite navigation display) which is associated with an infotainment system. The display panels 11, 13 can optionally comprise a touchscreen. A steering wheel 15 is provided on the driver side of the dashboard 9 to steer the vehicle V. The steering wheel 15 is provided with auxiliary controls (not shown), which allows control of the infotainment system and also can enable selective operational controls, such as activating/deactivating a cruise control function. The driver side and the passenger side of the cabin C are partially separated by a central console 17. The central console 17 comprises a gear selector 19 for operating transmission changes of the vehicle V; and controls 21 for the infotainment system. The central console 17 also comprises a storage compartment 23.

Further storage compartments or bins are located in the side doors D1, D2 of the vehicle V; namely, a driver side storage compartment 25 and a passenger side storage compartment 27. A driver side control panel 29 is embedded within the driver side door D1 for controlling a driver side window $W_D$ and locking of the driver side door D1. A passenger side control panel 31 is embedded within the passenger side door D2 for controlling a passenger side window $W_P$ and locking of the passenger side door D2. A roof control panel 33 is located in the roof portion 5 and comprises light sources for selectively illuminating sections within the cabin C. For example, the roof control panel 33 can selectively illuminate the driver side, passenger side and/or a centre of the front portion of the cabin C.

The various features of the cabin C (such as the storage compartments 23, 25, 27, the instrument display panel 11, the infotainment system display panel 13 and the roof control panel 33) are referred to herein as "visual zones". These visual zones are designated areas around the cabin C that the vehicle occupant is expected to look at (i.e. in case of a window). Visual zones can also be present outside of the cabin C, such as areas that can be seen by the vehicle occupant(s) through the front windscreen $W_F$ and/or the rear windscreen $W_R$ and/or the side windows $W_D$, $W_P$.

One or more illumination sources $L_n$ (where n is a whole number) are associated with each visual zone. The illumination sources $L_n$ can, for example, comprise a Light Emitting Diode (LED) disposed behind a diffuser or coupled to a light guide. The illumination sources $L_n$ can be controlled independently from one another to provide selective lighting. Alternatively, at least some of the illumination sources $L_n$ can be arranged in predefined subsets which can be operated in unison. The interior lights can form a first subset and the exterior lights can form a second subset.

In this example, the display panels 11, 13 is provided in the form of a Light Emitting Diode (LED) display, but it will be appreciated that the display panels 11, 13 can be provided as any other form of display which can output light, such as a Liquid-Crystal Display (LCD), as will be appreciated by a person skilled in the art. The infotainment system control panel 13 is a touchscreen such as a capacitive touchscreen or a resistive touchscreen. Other components of the cabin C can simply be backlit, or provided with an incandescent light source, LED, etc., in proximity thereto so as to highlight a particular feature, particularly in low light conditions.

Figure 2:
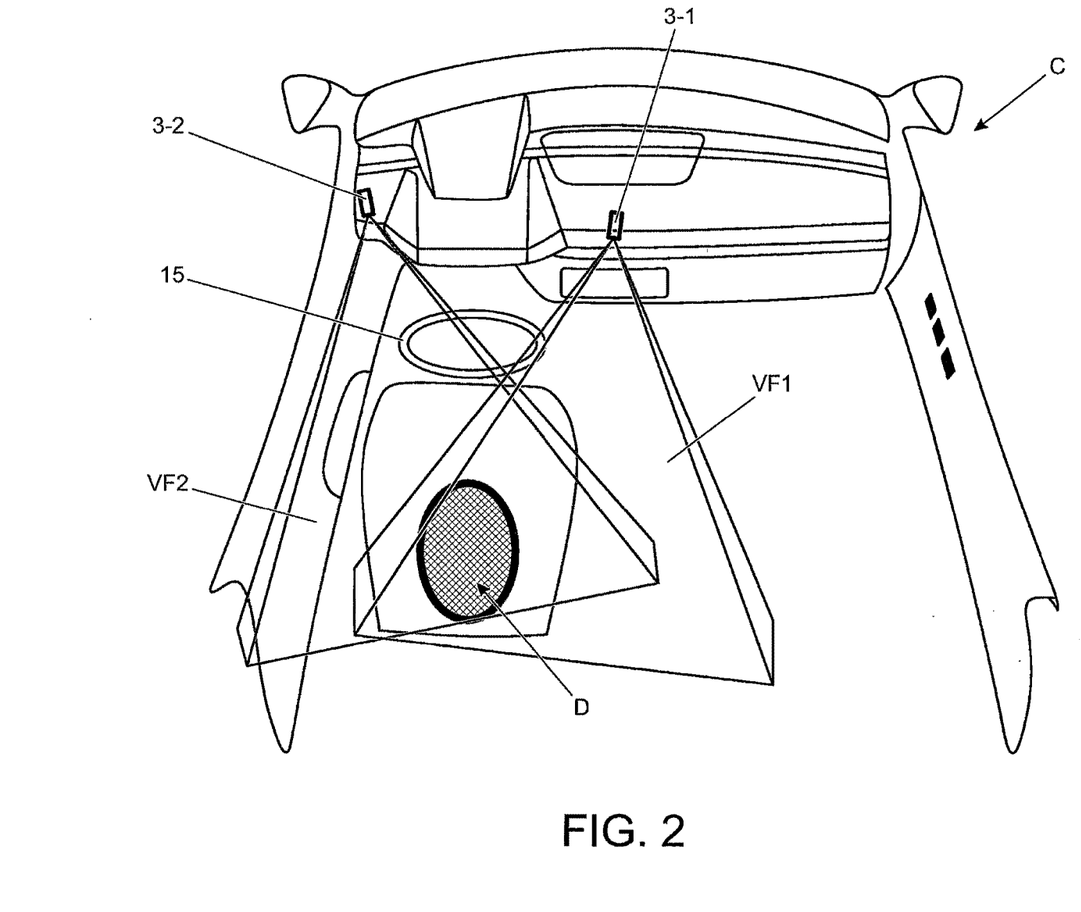
FIG. 2 is a perspective view of the vehicle cabin illustrating the field of view of the image sensors employed in the dynamic lighting apparatus according to an embodiment of the present invention.

The first and second image sensors 3-1, 3-2 each comprise a driver-facing camera. The first and second image sensors 3-1, 3-2 can detect infra-red (or near infra-red) to implement an eye-tracking function. In a variant, the first and second image sensors 3-1, 3-2 could detect light at a visible wavelength. However, the use of first and second image sensors 3-1, 3-2 which detect light in the visible spectrum may require cabin lighting to provide illumination in low light conditions. As shown in FIG. 2, the first image sensor 3-1 is located in the dashboard 9 below a centre-point of the front windscreen $W_F$, and the second image sensor 3-2 is located near a bottom corner of the front windscreen $W_F$ on the driver side of the vehicle V. The first and second image sensors 3-1, 3-2 are oriented inwardly into the cabin C. The field of view matrix of each of the first and second image sensors 3-1, 3-2 is illustrated in FIG. 2 by respective view frustums VF1, VF2. The driver D is shown schematically in FIG. 2. In operation, the first and second image sensors 3-1, 3-2 each generate image data which is output to an image processor. The first and second image sensors 3-1, 3-2 are configured to detect the driver D and can determine a point of origin in three-dimensional coordinate space based on the position of the driver's head. The orientation of the driver's head can also be determined more accurately to model the gaze direction and/or to determine an approximate eye position for use by an eye-tracking mechanism. The position and orientation of the driver's head can be referred to collectively as the "head pose". The eye-tracking mechanism tracks the driver's eyes so as to determine an angular direction of the driver's target line of sight with respect to a fixed reference (known as "gaze direction").

The head orientation and the gaze direction are calculated with respect to a three-dimensional model $C_{MOD}$ of the cabin C, as described in more detail with reference to FIGS. 3 to 6. The three-dimensional model $C_{MOD}$ comprises one or more predefined areas of interest $A_n$ (where n is a whole number). The areas of interest $A_n$ are defined as elements arranged in three-dimensions within the three-dimensional model $C_{MOD}$ and are each associated with a particular visual zone. For example, the area of interest $A_n$ can correspond to an internal feature, and hence visual zone, of the vehicle V such as one of many compartments, control panels, information panels, bins, consoles and so forth. The area of interest $A_n$ can also be associated with an external visual zone or region relative to the vehicle V, such as an area extending from the sides or corners of the vehicle V.

Using the determined point of origin O and gaze direction, a virtual projection $P_V$ (which can be referred to as a "gaze vector") is then determined so as to represent the driver's line of sight with respect to the cabin C. The virtual projection $P_V$ is integrated with the three-dimensional model $C_{MOD}$ of the cabin C to determine where the occupant is looking. A check is performed to determine if the virtual projection $P_V$ intersects a predefined one of said areas of interest $A_n$ within the three-dimensional model $C_{MOD}$.

When it is determined that the virtual projection $P_V$ intersects one of said areas of interest $A_n$ within the virtual model $C_{MOD}$, a control is generated to increase an output intensity of the illumination source $L_n$ associated with that visual zone by a predetermined amount (or switch on the illumination source $L_n$ if currently switched off). For example, the virtual projection $P_V$ could intersect an area of interest $A_n$, which represents the occupant looking at the infotainment system control panel 13 (which is defined as one of said visual zones), and accordingly, the light intensity of the infotainment system control panel 13 is increased. In another example, the virtual projection $P_V$ could intersect an area of interest $A_n$ indicating that the occupant is looking through the driver side window $W_D$, such that the associated visual zone is an area outside of the vehicle V (in the general direction in which the occupant is looking) and hence the light intensity of an illumination source $L_n$, configured to highlight such a visual zone is increased.

The intensity increase is controlled in a continuous manner from a first intensity level to a second, higher intensity level. The output intensity is maintained at the second intensity level for a predefined time period and/or until it is determined that the occupant is no longer looking at the determined visual zone. After the specified time period and if the occupant is determined to no longer be looking at the visual zone, the light intensity is decreased in a continuous manner from the second intensity level to the first intensity level. An alternate implementation would provide a stepped change in the intensity level, for example between one or more different predefined illumination levels.

The vehicle V is thereby provided with a dynamic lighting apparatus 1 with a visual interaction control mechanism such that the vehicle driver D can automatically highlight a particular visual zone by looking at or towards that visual zone. When a visual zone is not being looked at, the associated illumination source $L_n$ is caused to have a low-level output intensity (e.g. illumination at the first intensity level) or is otherwise switched off. In this manner, the intensity output of the various illumination sources $L_n$ can be increased and decreased to correspond with the driver's gaze. For example, if the driver D scans the interior of the cabin C and the driver's gaze passes several visual zones (and hence the virtual projection $P_V$ intersects several associated areas of interest $A_n$), each visual zone will be highlighted in turn as the driver's gaze crosses that area.

The dynamic lighting apparatus 1 identifies an area of interest $A_n$ corresponding to a visual zone at which the driver D is looking. The dynamic lighting apparatus 1 then operates to control one or more of said illumination sources $L_n$ to highlight the visual zone associated with the identified area (or areas) of interest $A_n$. The areas of interest $A_n$ are identified herein with a subscript corresponding to the reference numeral of the associated feature of the vehicle V. Similarly, the illumination sources $L_n$ are identified by a subscript corresponding to the reference numeral of the associated feature of the vehicle V.

Figure 3:
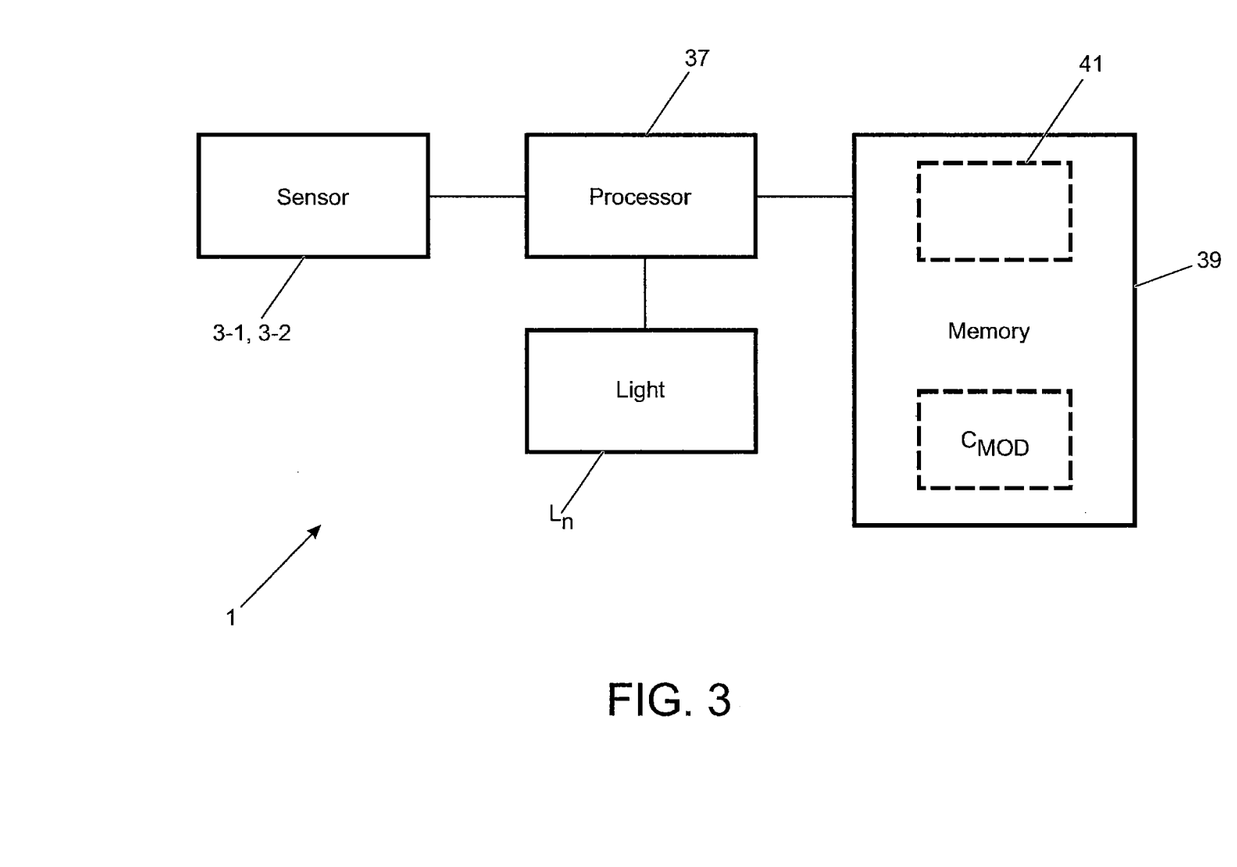
FIG. 3 is a schematic block diagram of a dynamic lighting apparatus according an embodiment of the present invention.

FIG. 3 is a schematic block diagram of the dynamic lighting apparatus 1. The dynamic lighting apparatus 1 comprises one or more processors 37 (only one is shown for simplicity of explanation) and one or more memories 39 (only one is shown for simplicity of explanation) having computer code 41 stored thereon. The dynamic lighting apparatus 1 is coupled to the first and second image sensors 3-1, 3-2 and a plurality of said illumination sources $L_n$ described above with reference to FIG. 1. The one or more processors 37 are in communication with the one or more memories 39, the first and second image sensors 3-1, 3-2 and the illumination sources $L_n$.

The first and second image sensors 3-1, 3-2 each comprise a driver-facing camera and at least one of said first and second image sensors 3-1. 3-2 comprises infra-red (or near infra-red) capability for eye-tracking purposes. In a variant, the first and second image sensors 3-1, 3-2 could detect light at a visible wavelength to determine head position and/or eye gaze.

However, the use of image sensors 3-1, 3-2 to detect light in the visible spectrum may require cabin lighting to be illuminated in order to operate in the dark.

The one or more memories 39 store the three-dimensional model $C_{MOD}$ of the vehicle cabin C. The three-dimensional model $C_{MOD}$ defines the key features of the inside of the cabin C. At least in certain embodiments, the three-dimensional model $C_{MOD}$ can be derived from a Computer-Aided Design (CAD) model of the vehicle V. In this manner, portions of the interior cabin C can be mapped onto a virtual vehicle cabin defined by the three-dimensional model $C_{MOD}$. The interior virtual vehicle cabin comprises a plurality of predefined areas of interest $A_n$, which are associated with visual zones relating to the cabin C. As each visual zone is associated with an area of interest $A_n$, the illumination level (intensity) of that visual zone can be controlled by comparing the virtual projection $P_V$ with the three-dimensional model $C_{MOD}$.

The use of the dynamic lighting apparatus 1 is dependent on a mode of operation of the vehicle V. In particular, the dynamic lighting apparatus 1 can be switched off in a default configuration and can be manually switched on. In a "dynamic" mode of operation, the vehicle V can sense external light conditions, and responsive to low-light conditions (i.e. when a detected external light intensity or ambient light has been determined to fall below a predetermined intensity threshold), the dynamic lighting apparatus 1 can be switched on and the interior lighting for particular clusters of areas of interest within the vehicle V can be set at a first intensity level. The dynamic mode can be operated to affect control of the interior lighting of the vehicle V only. In a "stealth" mode of operation (which can be an alternative or additional mode of operation to the dynamic mode), the dynamic lighting apparatus 1 operates as described herein except that the interior illumination sources $L_n$ of the vehicle V are controlled to reduce illumination levels when the corresponding areas of interest $A_n$ are not activated (as opposed to the interior illumination sources $L_n$ being set to the first intensity level as in the dynamic mode), and increased to a first or second intensity level upon activation. The interior illumination sources $L_n$ can be switched off such that only those interior illumination sources $L_n$ associated with essential display information remain illuminated. In an "off-road" mode of operation, the dynamic lighting apparatus 1 solely controls the external lighting of the vehicle V. It will be appreciated that the dynamic or stealth mode can be used in combination with the off-road mode.

The operation of the dynamic lighting apparatus 1 will now be explained in detail with reference to a three-dimensional model $C_{MOD}$ shown in FIGS. 4, 5A and 5B.

Figure 4:
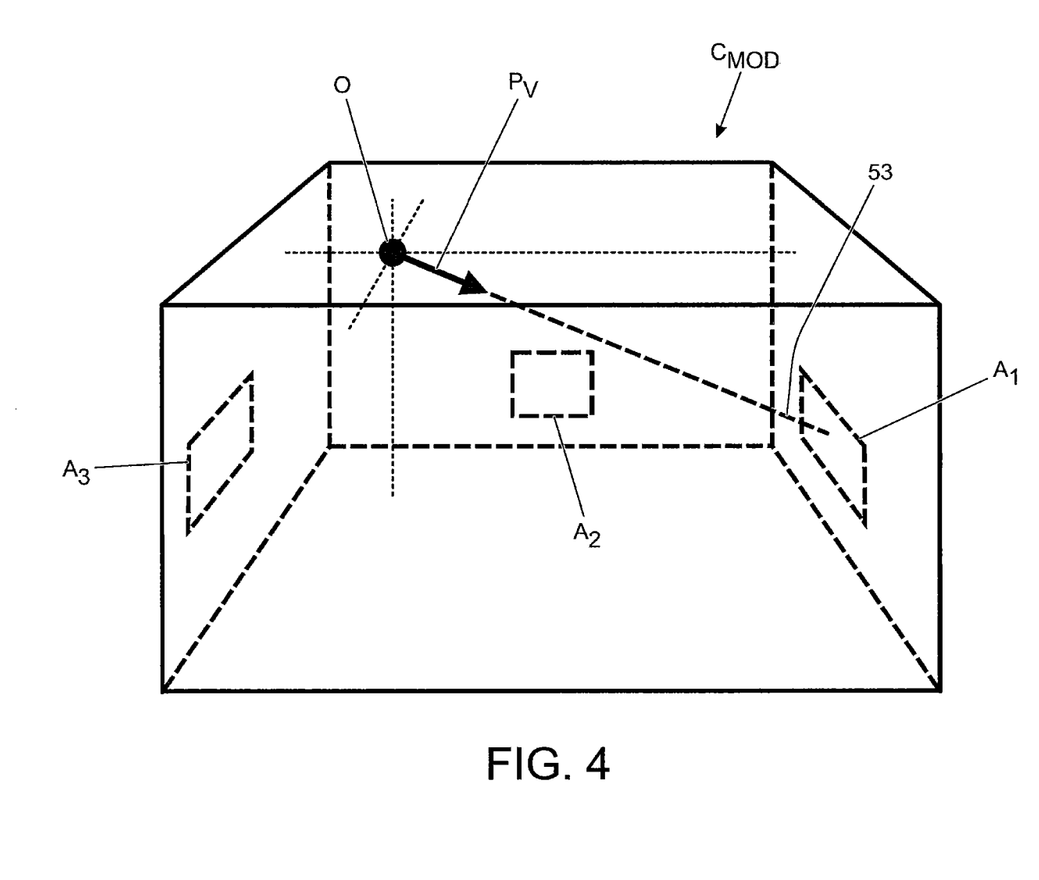
FIG. 4 is a schematic diagram illustrating the operation of the dynamic lighting apparatus according to an embodiment of the present invention.

FIG. 4 is a schematic of the three-dimensional model $C_{MOD}$, which provides a virtual representation of the cabin C of FIG. 1. The virtual representation has been simplified for ease of explanation, however, it will be appreciated that the virtual representation will be understood to map onto the cabin C of FIG. 1 in dimension and shape so as to follow the contours of the cabin C. The three-dimensional model $C_{MOD}$ comprises a plurality of predefined areas of interest $A_n$ each associated with a different one of said visual zones relating to the cabin C. In this example, only three areas of interest $A_n$ are shown for simplicity of explanation: a first area of interest $A_1$, a second area of interest $A_2$, and a third area of interest $A_3$.

For example, the first area of interest $A_1$ is associated with the passenger side storage compartment 27, the second area of interest $A_2$ is associated with the controls 21 for the infotainment system, and the third area of interest $A_3$ is associated with the driver side control panel 29. The areas of interest $A_n$ are each associated with one of said illumination sources $L_n$ within the vehicle cabin C. In other examples, such as that described below with respect to FIG. 7, the areas of interest $A_n$ correspond to the side windows $W_D$, $W_P$ defined within the three-dimensional model $C_{MOD}$ and are associated with visual zones to the exterior of the vehicle V.

Figure 5A:
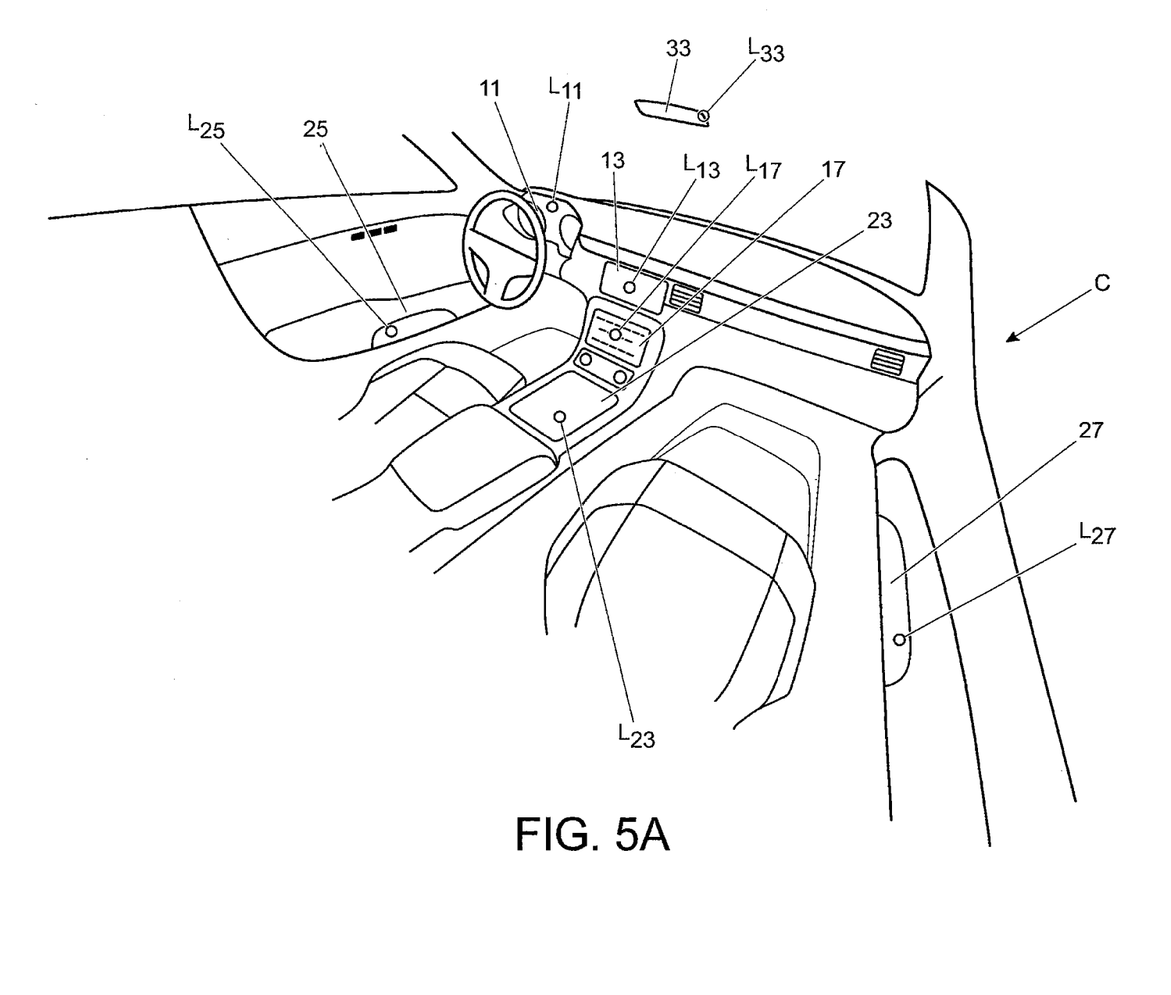
FIGS. 5A and 5B show a three-dimensional model of the vehicle cabin of FIG. 1.
Figure 5B:
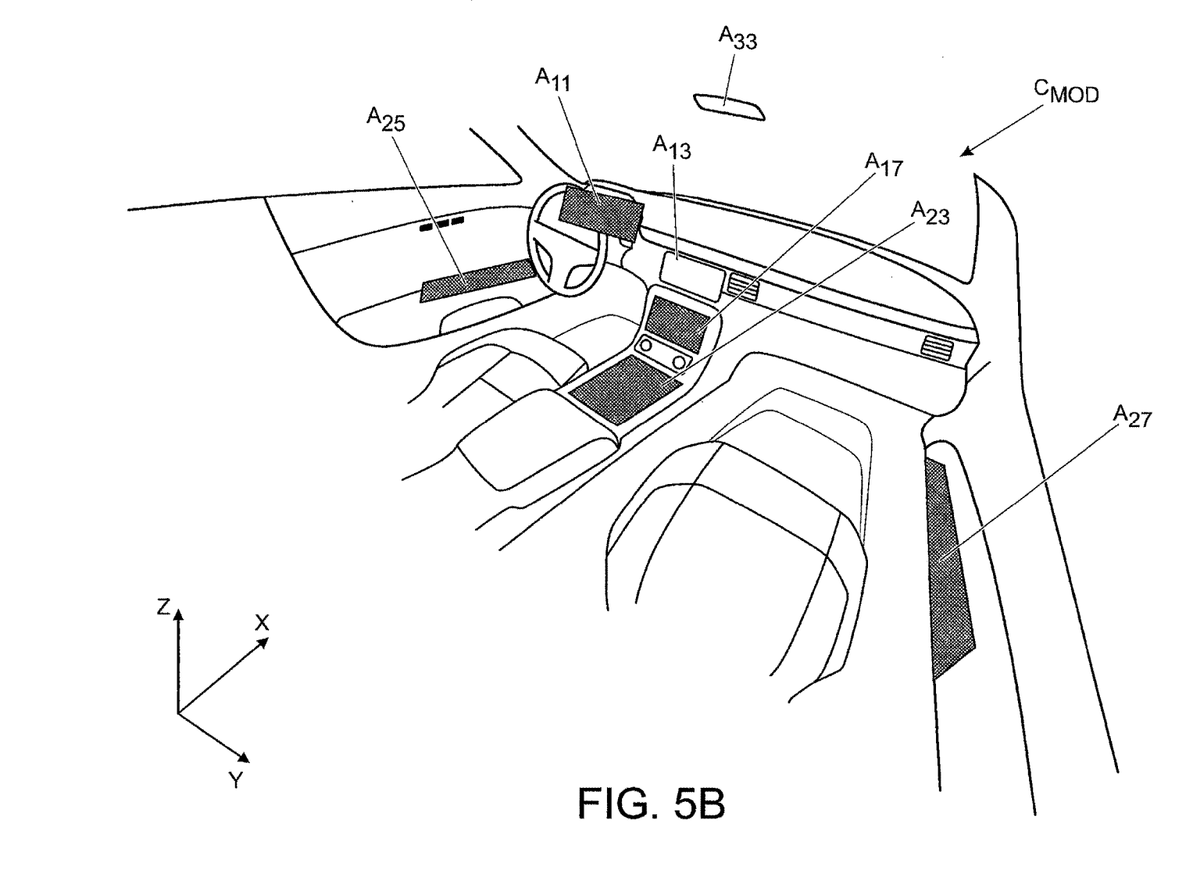

The integration of the three-dimensional model $C_{MOD}$ with the cabin C is illustrated in FIGS. 5A and 5B. As illustrated in FIG. 5A, the cabin C is modelled in three-dimensions, for example based on a CAD representation of the vehicle V. The areas of interest $A_n$ are identified with reference to this model and the resulting data is used to generate the three-dimensional model $C_{MOD}$ stored in said memory of the dynamic lighting apparatus 1. The areas of interest $A_n$ are illustrated in FIG. 5B as shaded regions positioned over the underlying cabin model (shown in phantom). The position and orientation of each area of interest $A_n$ is defined in three dimensions within the three-dimensional model $C_{MOD}$. It will be appreciated that the size and shape of each area of interest $A_n$ can be defined to correspond to the configuration of the corresponding feature within the cabin C.

Figure 6A:
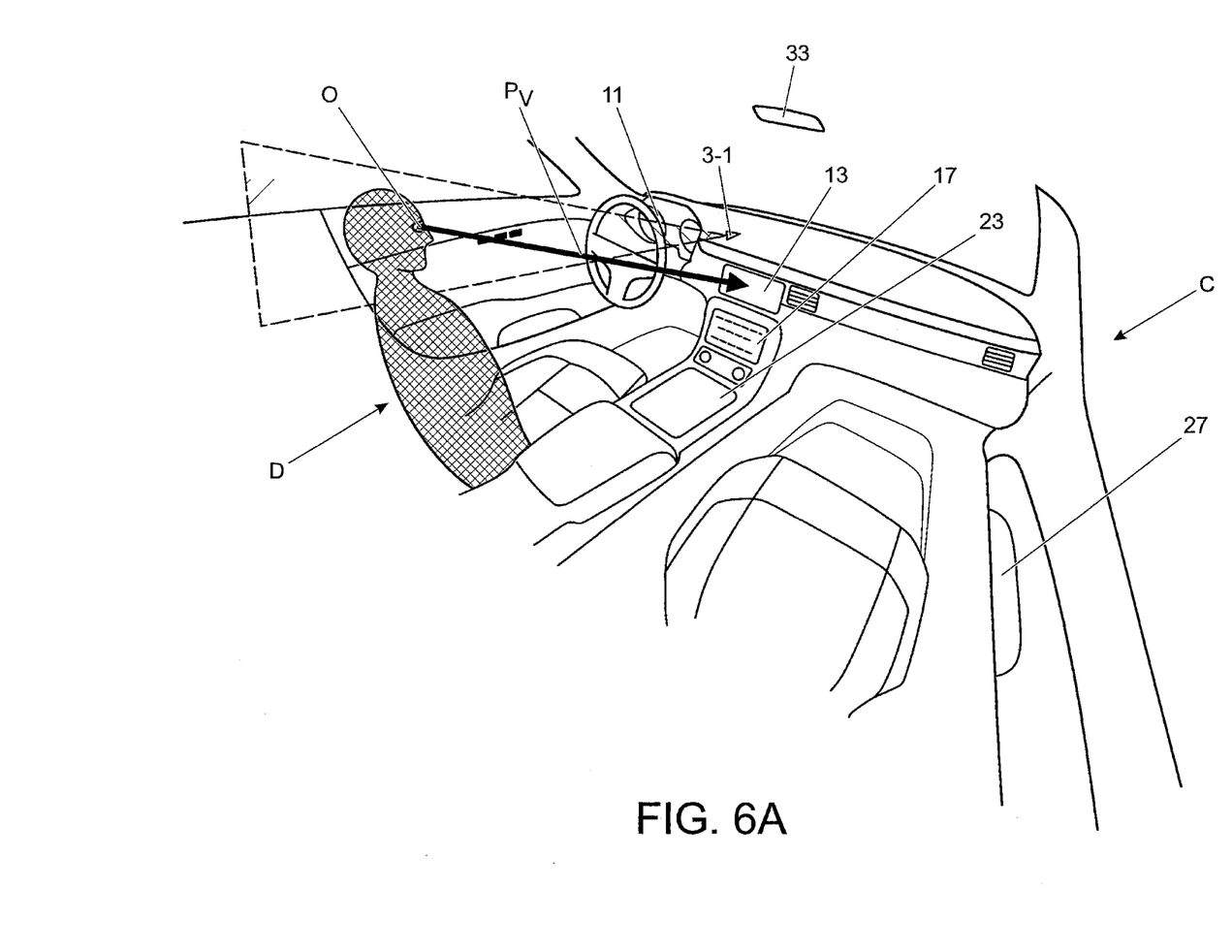
FIGS. 6A and 6B illustrate the operation of the dynamic lighting apparatus according to an embodiment of the present invention based on the three-dimensional model shown in FIGS. 5A and 5B.
Figure 6B:
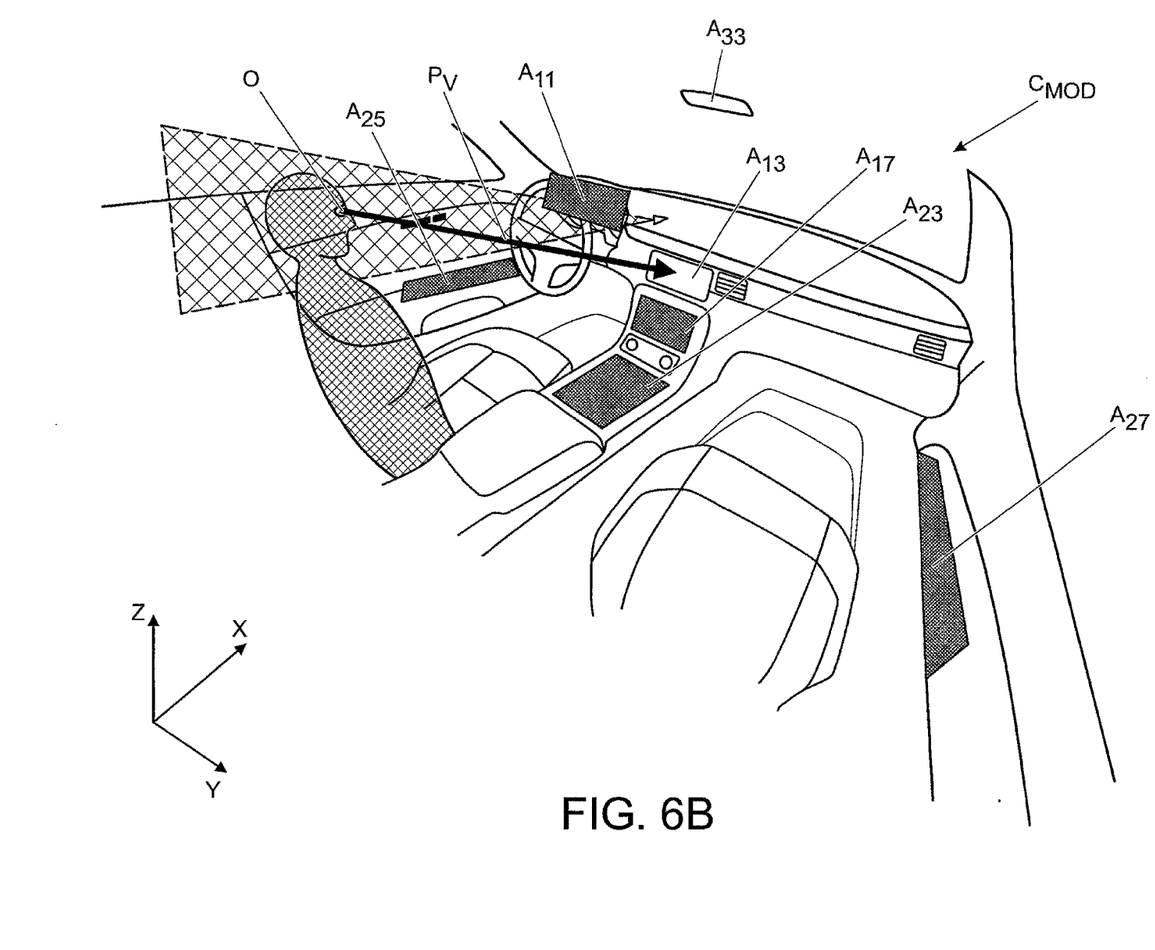

In operation, the processor 37 receives image data from the first and second image sensors 3-1, 3-2 and performs image processing in order to determine the point of origin O and a gaze direction for the vehicle occupant. The point of origin O is shown in FIG. 4 as being on a driver side of the cabin C and the gaze direction is shown to be pointing from the point of origin O towards the passenger side of the cabin C. The point of origin O is a point in three-dimensional coordinate space, as illustrated by the dotted lines of FIG. 4 which represent a three-dimensional axes system (X-axis, Y-axis, Z-axis). Similarly, the gaze direction is defined with respect to the three-dimensional axes and therefore will have an angular offset with respect to each axis. The implementation of this technique to track the head position and gaze direction of the user is illustrated in FIGS. 6A and 6B. As shown in FIG. 6A, the first and second image sensors 3-1, 3-2 are used to determine the point of origin O and the gaze direction. The virtual projection $P_V$ is generated based on the determined point of origin O and the gaze direction. The virtual projection $P_V$ is then combined with the three-dimensional model $C_{MOD}$ to determine which said area of interest $A_n$ is currently being looking at by the user. This analysis can be performed substantially in real time and the corresponding visual zone identified. The dynamic lighting apparatus 1 increases the intensity of the illumination source $L_n$ associated with that area of interest $A_n$ thereby highlighting the visual zone at which the user is currently looking.

In more detail, the point of origin is calculated by first using image data to identify a face of the vehicle occupant, for example, using face detection algorithms or "face-tracking" as is well known in the art. Following the identification, an approximation can be made of the position and orientation of the driver's head. Image processing techniques are then used to identify eye position.

Having determined the head position, orientation and eye position, the processor 37 can calculate the point of origin O in a three-dimensional space of the cabin C. The point of origin O can be chosen as a mid-point between the eyes of the vehicle occupant. The point of origin O is calculated with respect to a vehicle cabin origin (not shown), which is a centre-point origin position in the cabin C.

In particular, as there are two image sensors 3-1, 3-2 spaced by a known, predetermined distance, a triangulation calculation can be performed to determine the point of origin O with respect to the vehicle cabin origin. The use of the first and second image sensors 3-1, 3-2 allows a depth dimension to be determined in addition to other spatial dimensions. Fixed reference points for the first and second image sensors 3-1, 3-2 can also be used to assist determining the point of origin O.

Thereafter, the image sensors 3-1, 3-2 are used to perform eye tracking to determine the gaze direction. For example, infra-red or near infra-red light can be directed towards the driver's eyes, which can reflect off the eyes to provide information about the direction in which the vehicle occupant is looking. Image processing is then carried out so as to determine the gaze direction.

The processor 37 then calculates a virtual projection $P_V$ representative of a line of sight of the driver D based on the point of origin O and the gaze direction. The virtual projection $P_V$ is plotted in the three-dimensional model $C_{MOD}$ so that it initiates at the determined point of origin O and has a direction coincident with the determined gaze direction. The processor 37 then determines if the virtual projection $P_V$ intersects one of the plurality of areas of interest $A_n$ defined within the three-dimensional model $C_{MOD}$. The intersected areas of interest $A_n$ correspond with a visual zone currently being viewed by the vehicle occupant. In this example, the first area of interest $A_1$ is intersected by the virtual projection $P_V$ and hence the current visual zone is the passenger side storage compartment 27.

The intersection within the three-dimensional model $C_{MOD}$ identifies the first area of interest $A_n$ and the dynamic lighting apparatus 1 causes the illumination source $L_n$ associated with the first area of interest $A_1$ (the passenger side storage compartment 27 in the illustrated example) to increase intensity thereby to highlight the current visual zone. The intensity of illumination output of the illumination source $L_n$ is increased by a predetermined amount and for a predetermined period of time and until the vehicle occupant is determined as no longer looking at the first area of interest $A_1$. Accordingly, the intensity output of the illumination source $L_n$ increases from a first intensity level to a second intensity level until the predetermined time period has expired and the vehicle occupant is no longer looking at the area of interest $A_n$.

The dynamic lighting apparatus 1 is provided with a sensitivity function such that a predetermined activation threshold is provided. More particularly, the relevant areas of interest $A_n$ are activated based on a determination that the virtual projection $P_V$ has intersected the illumination activation region 47 for a time period equal to or greater than the predetermined activation threshold. If the time period for intersection is less than the predetermined activation threshold, then no intensity increase is provided. Once activated, the associated illumination source $L_n$ will be maintained in its current state for a predetermined activation time period after the virtual projection $P_V$ has been determined as no longer intersecting the area of interest $A_n$. This predetermined activation time period is reset upon the virtual projection $P_V$ having been determined to re-intersect the illumination activation region 47 before the predetermined activation time period has expired. The predetermined activation threshold and the predetermined activation time period are adjustable.

An alternate implementation of the dynamic lighting apparatus 1 will now be described with reference to FIG. 7. Like reference numerals will be used for like components. This implementation is configured to control exterior vehicle lighting to illuminate external visual zones corresponding to the direction in which the occupant of the vehicle V is looking. This implementation has particular application when driving off-road where the ability to illuminate visual zones around the vehicle V is particularly advantageous.

An oval shape is used in this figure to represent the torso of the driver D and the determined virtual projection $P_V$ is illustrated by an arrow. Several areas of interest $A_n$ for the cabin C are designated by diamond-shaped indicia. In the illustrated arrangement, the driver D is looking at the infotainment system control panel 13 is the current area of interest and also the current visual zone. Accordingly, the infotainment system control panel 13 is highlighted by increased luminous output intensity (i.e. output intensity at the second level). The other areas of interest $A_n$ for which interior illumination is provided can be set to a low-level output intensity (i.e. at the first level).

Figure 7:
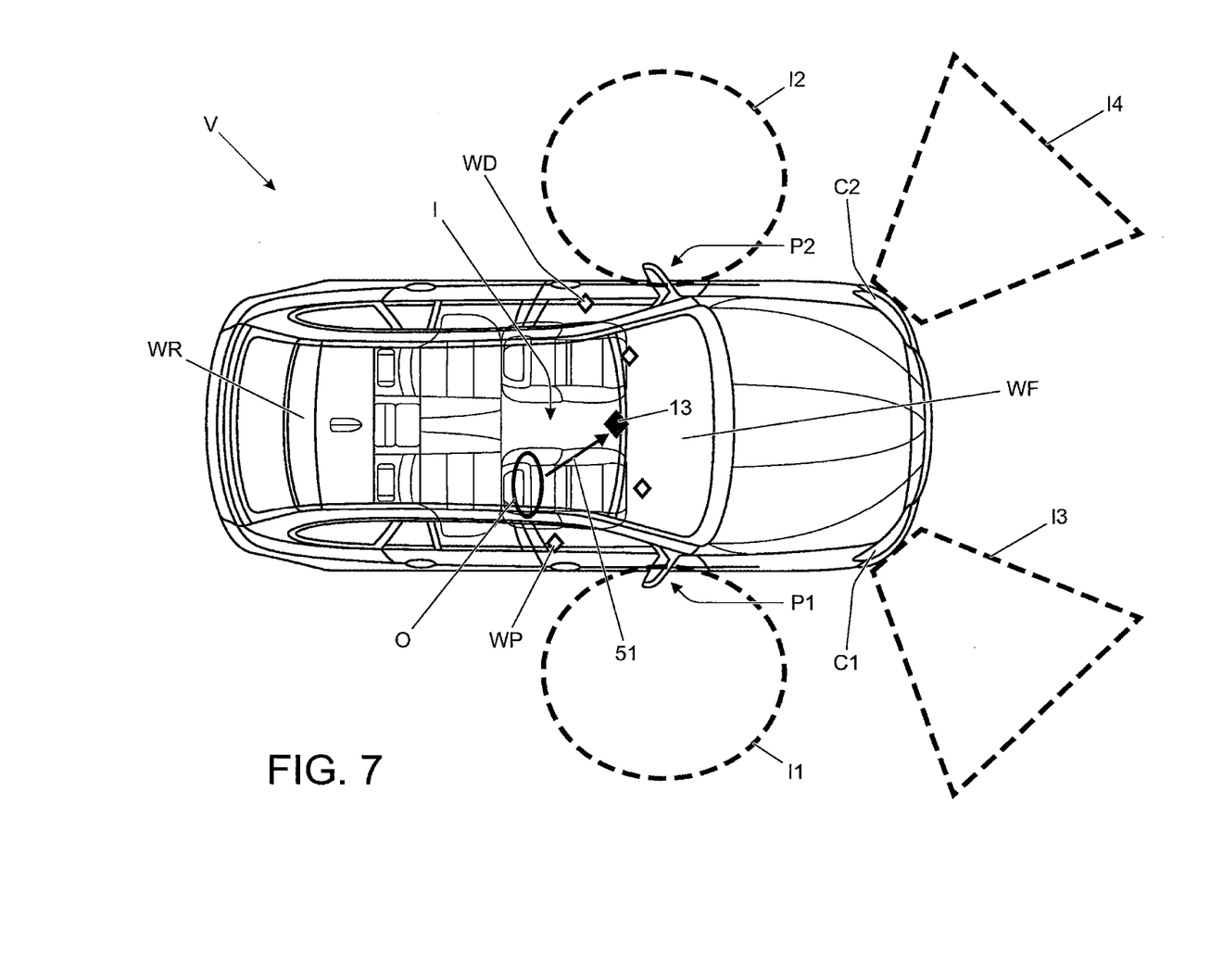
FIG. 7 is a schematic diagram showing a plan view of a vehicle comprising the dynamic lighting apparatus according to a further embodiment of the present invention.

For example, and as shown in FIG. 7, several external illumination sources $L_n$ are provided about the vehicle V, namely, a first puddle lamp P1, a second puddle lamp P2, a first cornering lamp C1 and a second cornering lamp C2. The first and second puddle lamps P1, P2 are disposed on the corresponding wing mirrors of the vehicle V. The puddle lamps P1, P2 are each designed to illuminate visual zones outside of the vehicle V as shown by a first illumination area I1 and a second illumination area I2, respectively. The first and second cornering lamps C1, C2 are disposed at front corners of the vehicle V and are also designed to illuminate visual zones outside of the vehicle V as shown by a third illumination area I3 and a fourth illumination area I4, respectively.

The areas of interest $A_n$ in this example correspond with the front windscreen $W_F$, the driver side window $W_D$, the passenger side window $W_P$. Each of these areas of interest $A_n$ can be activated by intersection of the virtual projection $P_V$ so as to increase the intensity of an external illumination source $L_n$ and thereby highlight the relevant visual zone outside of the vehicle V. The dynamic lighting apparatus 1 can be configured also to determine the location where the virtual projection $P_V$ intersects the area of interest $A_n$. The visual zone can then be illuminated based on the intersect position within the area of interest $A_n$.

Accordingly, activation of an area of interest $A_n$ corresponding to the driver side window $W_D$ causes the output intensity of the first puddle lamp P1 to be controlled. Activation of an area of interest $A_n$ corresponding to the passenger side window $W_P$ causes the output intensity of the second puddle lamp P2 to be controlled. Determination of an intersection on the driver side of the area of interest $A_n$ corresponding to the front windscreen $W_F$ causes the dynamic lighting apparatus 1 to increase the output intensity of the first cornering lamp C1. Determination of an intersection on the passenger side of the area of interest $A_n$ corresponding to the front windscreen $W_F$ causes the dynamic lighting apparatus 1 to increase the output intensity of the second cornering lamp C2. The control of the intensity of the illumination sources $L_n$ is dependent on the mode of operation and accordingly can be configured to increase from a first intensity level to a second intensity level, or can simply be switched on from a default off position.

Embodiments of the present invention as described herein refer to illumination being provided for various visual zones. It will be appreciated that the invention is applicable in instances where a low-lit environment is apparent, such as at night.

It will be appreciated that, whilst embodiments of the present invention have been described above with respect to specific examples, various modifications and alternative arrangements will be possible. For example, in the embodiments described with reference to the accompanying Figures, highlighting a visual zone is described as being performed using illumination output intensity control techniques. Alternatively, or additionally, beam control techniques can be used to highlight visual zones. For example, the driver of the vehicle V during low lighting conditions may wish to highlight particular visual zones in front of the vehicle V, such as when in an off-road mode of operation and driving at a low speed. Accordingly, the driver's gaze could scan ahead of the vehicle V, through the front windscreen $W_F$ to try and get a better view of the off-road surface before allowing the vehicle V to travel over the off-road surface. In this example, the area of interest $A_n$ corresponds with the front windscreen $W_F$. When determining the virtual projection $P_V$ relating to the driver's gaze and the relevant intersected area of interest $A_n$, a focal point of the virtual projection $P_V$ can also be determined. In this regard, the three-dimensional model $C_{MOD}$ can be extended to encompass a projected volumetric space representative of a region ahead of the vehicle V so as to enable the focal point to be determined with respect to the three-dimensional model $C_{MOD}$. Based on the determined focal point, a longitudinal beam direction of the vehicle V's headlamps and/or auxiliary lamps can be controlled so as to highlight the determined visual zone. It will be understood that various beam forming techniques are possible so as to modify a beam pattern and cause a particular visual zone to be highlighted.

The embodiments described herein have referred to control of the dynamic lighting apparatus 1 based on a determined gaze direction of the driver D. It will be appreciated that the dynamic lighting apparatus could be configured for other occupants of the vehicle V, for example a passenger seated in the passenger seat S2. In the embodiments described herein, a dynamic lighting apparatus 1 is described with respect to a front portion of a cabin C. It will be appreciated that the dynamic lighting apparatus 1 can also be used for lighting associated with visual zones in a rear portion of the cabin C. In this regard, additional, dedicated image sensors can be provided for each vehicle occupant so as to enable separate highlighting control. The areas of interest $A_n$ of the front and rear portions of the cabin C can be divided into separate sectors so that only a vehicle occupant of that sector can control the lighting of the related visual zones. The driver can be provided with overriding control of all sectors.

In the embodiments described herein, activation of an area of interest $A_n$ is based on an intersection of a virtual projection $P_V$ with that area of interest $A_n$ satisfying a predetermined activation threshold. In an alternative embodiment, a head pose virtual projection $P_V$ representative of a line of sight of a vehicle occupant based on head position and/or orientation is also determined. The intersection of the head pose virtual projection $P_V$ with an area of interest $A_n$ can cause an increase in output intensity of an illumination source $L_n$ to a first intensity level. This can supplement the determination of the virtual projection $P_V$ so that highlighting can be provided when the virtual projection $P_V$ is not available (e.g. when no eye-tracking data is available).

The three-dimensional model $C_{MOD}$ has been described herein as representing at least a portion of the vehicle cabin C. It will be appreciated that the three-dimensional model $C_{MOD}$ could be extended to define an area around the vehicle V. In this arrangement, the areas of interest $A_n$ for controlling the exterior lighting could be defined to an exterior of a virtual representation of the vehicle V.

Further aspects of the present invention are set out in the following series of numbered paragraphs.

1. A method for selectively highlighting visual zones associated with a vehicle, the method comprising:
    determining a point of origin in three-dimensional coordinate space based on the position of a vehicle occupant's head;
    determining a gaze direction of the vehicle occupant;
    using the determined point of origin and the determined gaze direction to plot a virtual projection, the virtual projection extending from the determined point of origin in a direction of the determined gaze direction; and
    with reference to a three-dimensional model comprising a plurality of predefined areas of interest, determining that the virtual projection has intersected one of the plurality of areas of interest and controlling an illumination source that is associated with the determined one of said plurality of areas of interest so as to highlight a visual zone associated with the vehicle.

2. A method as described in paragraph 1, wherein the three-dimensional model comprises a virtual representation of an interior portion of a cabin of the vehicle.

3. A method as described in paragraph 2, wherein the plurality of areas of interest are predefined areas of the three-dimensional model, each of the plurality of areas of interest corresponding to a visual zone associated with the interior portion of the vehicle cabin.

4. A method as described in paragraph 1, wherein determining the point of origin comprises using a face recognition algorithm.

5. A method as described in paragraph 1, wherein determining the gaze direction comprises using an eye tracking algorithm.

6. A method as described in paragraph 1, wherein the point of origin and the gaze direction is determined using image data received from two or more image sensors located within the vehicle.

7. A method as described in paragraph 1, wherein each of the plurality of areas of interest is associated with a dedicated illumination source.

8. A method as described in paragraph 1, wherein the controlling of the illumination source is performed by increasing an output intensity of the illumination source.

9. A method as described in paragraph 8, comprising identifying the areas of interest for which no intersection has been determined and reducing an output intensity of illumination sources associated with the identified areas of interest.

10. A method as described in paragraph 1, wherein the associated illumination source is arranged to provide highlighting of a visual zone that is substantially inside of the vehicle for an intersection of the virtual projection with one of a first subset of the plurality of areas of interest.

11. A method as described in paragraph 1, wherein the associated illumination source is arranged to provide highlighting of a visual zone that is substantially outside of the vehicle for an intersection of the virtual projection with one of a second subset of the plurality of areas of interest.

12. A dynamic lighting apparatus for selectively highlighting visual zones associated with a vehicle, the dynamic lighting apparatus comprising:
at least one processor; and
at least one memory including computer program code, the at least one memory configured to store a three-dimensional model comprising a plurality of areas of interest;
wherein the at least one memory and the computer program code are configured to, with the at least one processor, cause the dynamic lighting apparatus to at least:
determine a point of origin in three-dimensional coordinate space based on the position of a vehicle occupant's head;
determine a gaze direction of the vehicle occupant;
use the determined point of origin and the determined gaze direction to plot a virtual projection, the virtual projection extending from the determined point of origin in a direction of the determined gaze direction; and
with reference to the three-dimensional model, based on a determination that the virtual projection has intersected one of the plurality of areas of interest, control an illumination source that is associated with the determined one of the plurality of areas of interest so as to highlight a visual zone associated with the vehicle.

13. A dynamic lighting apparatus as described in paragraph 12, wherein the three-dimensional model comprises a representation of an interior portion of a cabin of the vehicle.

14. A dynamic lighting apparatus as described in paragraph 13, wherein the plurality of areas of interest are predefined areas of the three-dimensional model, each of the plurality of areas of interest corresponding to a visual zone associated with the interior portion of the vehicle cabin.

15. A dynamic lighting apparatus as described in paragraph 12, wherein the processor is configured to cause the dynamic lighting apparatus to determine the point of origin using a face recognition algorithm.

16. A dynamic lighting apparatus as described in paragraph 12, wherein the processor is configured to cause the dynamic lighting apparatus to determine the gaze direction using an eye tracking algorithm.

17. A dynamic lighting apparatus as described in paragraph 12, comprising two or more image sensors configured to provide image data for determining the point of origin and the gaze direction.

18. A dynamic lighting apparatus as described in paragraph 12, wherein the processor is configured to cause the dynamic lighting apparatus to control the illumination source by increasing an output intensity of the illumination source.

19. A dynamic lighting apparatus as described in paragraph 18, wherein the processor is configured to cause the dynamic lighting apparatus to identify the areas of interest for which no intersection has been determined and reduce an output intensity of illumination sources associated with the identified areas of interest.

20. A dynamic lighting apparatus as described in paragraph 12, wherein the associated illumination source is arranged to provide highlighting of a visual zone that is substantially inside of the vehicle for an intersection of the virtual projection with one of a first subset of the plurality of areas of interest.

21. A dynamic lighting apparatus as described in paragraph 12, wherein the associated illumination source is arranged to provide highlighting of a visual zone that is substantially outside of the vehicle for an intersection of the virtual projection with one of a second subset of the plurality of areas of interest.

22. A vehicle comprising a dynamic lighting apparatus as described in paragraph 12.

The invention claimed is:

1. A method for controlling illumination within a vehicle, the method comprising:
determining three-dimensional co-ordinates representing a point of origin in three-dimensional coordinate space based on a position of a vehicle occupant's head;
determining a gaze direction of the vehicle occupant, wherein determining the gaze direction comprises using an eye tracking algorithm;
using the determined point of origin and the determined gaze direction to plot a virtual projection, the virtual projection extending from the determined three-dimensional coordinates representing the point of origin in a direction of the determined gaze direction, wherein the virtual projection is three-dimensional, and is therefore capable of extending with an angular offset from each of three orthogonal axes intersecting the point of origin; and
with reference to a three-dimensional model comprising a plurality of predefined areas of interest, determining that the virtual projection has intersected one of the plurality of predefined areas of interest and controlling an illumination source that is associated with the one of the plurality of predefined areas of interest to highlight a visual zone associated with the vehicle.

2. The method of claim 1, wherein the three-dimensional model comprises a virtual representation of an interior portion of a cabin of the vehicle.

3. The method of claim 2, wherein each of the plurality of predefined areas of interest correspond to a visual zone associated with the interior portion of the vehicle cabin.

4. The method of claim 1, wherein determining the point of origin comprises using a face recognition algorithm.

5. The method of claim 1, wherein the point of origin and the gaze direction are determined using image data received from two or more image sensors located within the vehicle.

6. The method of claim 1, wherein each of the plurality of predefined areas of interest is associated with a dedicated illumination source.

7. The method of claim 1, wherein the controlling the illumination source is performed by increasing an output intensity of the illumination source.

8. The method of claim 7, further comprising identifying predefined areas of interest for which no intersection has been determined and reducing an output intensity of illumination sources associated with the identified predefined areas of interest.

9. The method of claim 1, wherein the associated illumination source is arranged to highlight the visual zone associated with the vehicle that is substantially inside of the vehicle for an intersection of the virtual projection with one of a first subset of the plurality of predefined areas of interest or to highlight a visual zone associated with the vehicle that is substantially outside of the vehicle for an intersection of the virtual projection with one of a second subset of the plurality of predefined areas of interest.

10. A dynamic lighting apparatus for selectively highlighting visual zones associated with a vehicle, the dynamic lighting apparatus comprising:
- at least one processor; and
- at least one memory configured to store a three-dimensional model comprising a plurality of areas of interest, and comprising computer program code that when executed by the at least one processor causes the at least one processor to:
  - determine three-dimensional co-ordinates representing a point of origin in three-dimensional coordinate space based on a position of a vehicle occupant's head;
  - determine a gaze direction of the vehicle occupant, wherein the at least one processor is configured to cause the dynamic lighting apparatus to determine the gaze direction using an eye tracking algorithm;
  - use the determined point of origin and the determined gaze direction to plot a virtual projection, the virtual projection extending from the determined three-dimensional coordinates representing the point of origin in a direction of the determined gaze direction, wherein the virtual projection is three-dimensional, and is therefore capable of extending with an angular offset from each of three orthogonal axes intersecting the point of origin; and
  - with reference to the three-dimensional model, based on a determination that the virtual projection has intersected one of the plurality of areas of interest, control an illumination source that is associated with the determined one of the plurality of areas of interest to highlight a visual zone associated with the vehicle.

11. The dynamic lighting apparatus of claim 10, wherein the three-dimensional model comprises a representation of an interior portion of a cabin of the vehicle.

12. The dynamic lighting apparatus of claim 11, wherein the plurality of areas of interest are predefined areas of the three-dimensional model, each of the plurality of areas of interest corresponding to a visual zone associated with the interior portion of the vehicle cabin.

13. The dynamic lighting apparatus of claim 10, wherein the at least one processor is configured to cause the dynamic lighting apparatus to determine the point of origin using a face recognition algorithm.

14. The dynamic lighting apparatus of claim 10, further comprising two or more image sensors configured to provide image data for determining the point of origin and the gaze direction.

15. The dynamic lighting apparatus of claim 10, wherein the at least one processor is configured to cause the dynamic lighting apparatus to control the illumination source to increase an output intensity of the illumination source.

16. The dynamic lighting apparatus of claim 15, wherein the at least one processor is configured to cause the dynamic lighting apparatus to identify the areas of interest for which no intersection has been determined and reduce an output intensity of illumination sources associated with the identified areas of interest.

17. The dynamic lighting apparatus of claim 10, wherein the associated illumination source is arranged to highlight the visual zone associated with the vehicle that is substantially inside of the vehicle for an intersection of the virtual projection with one of a first subset of the plurality of areas of interest or to highlight a visual zone associated with the vehicle that is substantially outside of the vehicle for an intersection of the virtual projection with one of a second subset of the plurality of areas of interest.

18. A vehicle comprising the dynamic lighting apparatus of claim 10.

19. The vehicle of claim 18, further comprising two or more image sensors for enabling the point of origin and the gaze direction to be determined by the dynamic lighting apparatus, wherein one of the image sensors is located on the occupant's side of the vehicle but not another of the image sensors, such that a steering wheel of the vehicle on the occupant's side of the vehicle is between the one image sensor and the another image sensor.

20. The dynamic lighting apparatus of claim 10, wherein the three-dimensional co-ordinates representing the point of origin include a variable depth dimension.

* * * * *